US009799935B2

(12) United States Patent
Zhou et al.

(10) Patent No.: US 9,799,935 B2
(45) Date of Patent: Oct. 24, 2017

(54) ELECTRICAL ENERGY PRODUCTION SYSTEM

(71) Applicant: Toyota Motor Engineering & Manufacturing North America, Inc., Erlanger, KY (US)

(72) Inventors: Feng Zhou, Ann Arbor, MI (US); Ercan Mehmet Dede, Ann Arbor, MI (US); Shailesh N. Joshi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 148 days.

(21) Appl. No.: 14/693,333

(22) Filed: Apr. 22, 2015

(65) Prior Publication Data

US 2016/0315491 A1    Oct. 27, 2016

(51) Int. Cl.
*H01M 14/00* (2006.01)
(52) U.S. Cl.
CPC ................... *H01M 14/00* (2013.01)
(58) Field of Classification Search
CPC .................................................. H02J 7/0068
USPC .......................................................... 320/128
See application file for complete search history.

(56) References Cited

U.S. PATENT DOCUMENTS

| | | | | |
|---|---|---|---|---|
| 3,510,357 A | * | 5/1970 | Nielsen | H01M 6/36 429/112 |
| 3,669,388 A | * | 6/1972 | Van Kreuningen | B64D 25/00 244/138 R |
| 5,264,298 A | * | 11/1993 | Townsend | H01G 9/21 429/102 |
| 5,335,719 A | | 8/1994 | Khelifa et al. | |
| 6,926,979 B2 | | 8/2005 | Cao | |
| 7,143,589 B2 | * | 12/2006 | Smith | B60H 1/3201 62/238.3 |

(Continued)

OTHER PUBLICATIONS

Fang Zhang et al., "A Thermally regenerative ammonia-based battery for efficient harvesting of low-grade thermal energy as electrical power", Energy Environ. Sci., Royal Society of Chemistry, Nov. 2014; DOI: 10.1039/C4EE02824D.

(Continued)

*Primary Examiner* — Edward Tso
*Assistant Examiner* — Jerry D Robbins
(74) *Attorney, Agent, or Firm* — Dinsmore & Shohl LLP

(57) ABSTRACT

An electrical energy production system includes at least a pair of thermally regenerating ammonia batteries. One of the batteries is in a charging mode; the other is in a discharging mode. A controller is operatively connected to the at least a pair of thermally regenerating ammonia batteries. At least one heat source is connected to the at least a pair of thermally regenerating batteries. A control valve is connected to the controller and to the at least a pair of thermally regenerating batteries. The control valve distributes heat from the heat source to a specified one of the at least a pair of thermally regenerating ammonia batteries. An electrical path connects each of the pair of thermally regenerating batteries to the controller and to a power rectification circuit. An external load is connected to the power rectification circuit such that a continuous power source is provided to the external load.

21 Claims, 5 Drawing Sheets

(56) References Cited

U.S. PATENT DOCUMENTS

| | | | | |
|---|---|---|---|---|
| 7,820,321 | B2* | 10/2010 | Horne | B60L 11/1824 |
| | | | | 429/120 |
| 8,931,277 | B2* | 1/2015 | Peterson | C02F 1/22 |
| | | | | 60/651 |
| 2003/0221438 | A1* | 12/2003 | Rane | B01D 53/263 |
| | | | | 62/271 |
| 2004/0058230 | A1* | 3/2004 | Hsu | B01J 19/249 |
| | | | | 429/62 |
| 2008/0036419 | A1* | 2/2008 | Cook | H02J 7/0031 |
| | | | | 320/104 |
| 2011/0220729 | A1 | 9/2011 | Bucknell | |
| 2013/0011704 | A1* | 1/2013 | Horne | B60L 11/1824 |
| | | | | 429/72 |
| 2015/0291870 | A1* | 10/2015 | Van Horn | C09K 5/047 |
| | | | | 252/69 |

OTHER PUBLICATIONS

Andrea, Elyse Messer, "Low-grade waste heeat regnerates ammonia battery", PennState, Dec. 3, 2014.
Penn State, "Low-grade waste heat regenerates ammonia battery", Science Daily, Dec. 3, 2014.

* cited by examiner

ELECTRICAL ENERGY PRODUCTION SYSTEM

FIELD OF THE INVENTION

The invention relates to electrical energy production systems and more particularly to electrical energy production systems including ammonia battery packs.

BACKGROUND OF THE INVENTION

Various devices may produce heat during their operation. Such devices include engines, power electronics, video displays, electric motors, and various other heat generating devices. Typically such waste heat from such devices would be considered low grade heat and would not be recycled or gathered for generating additional electrical power.

However, low grade heat has received attention due to its ability to generate additional electrical power using a carbon neutral production system. Various prior art technologies including thermoelectric type systems have been utilized in prior art for conversion of thermal energy directly into electrical energy. However, such systems are expensive and lack a high capacity for energy storage.

Motor vehicles include various heat sources such as from various powered electronics, heat generated from an internal combustion engine, various power control units for a hybrid vehicle, electric motors, as well as heat from various electronic devices associated with a vehicle. Often such waste heat must be dispersed such as through a radiator or heat sink to allow efficient operation of the various components. It is therefore desirable to harvest such waste heat and provide cooling to the various components while generating electrical power that may be utilized to power various systems within the vehicle. There is therefore a need in the art for an improved electrical energy production system that generates electrical energy from waste heat and provides a cooling or heat transfer from various components generating such heat.

SUMMARY OF THE INVENTION

In one aspect, there is disclosed an electrical energy production system that includes at least a pair of thermally regenerating ammonia batteries. One of the batteries is in a charging mode while the other is in a discharging mode. A controller is operatively connected to the at least a pair of thermally regenerating ammonia batteries. At least one heat source is connected to the at least a pair of thermally regenerating batteries. A control valve is connected to the controller and to the at least a pair of thermally regenerating batteries. The control valve distributes heat from the heat source to a specified one of the at least a pair of thermally regenerating ammonia batteries. An electrical path connects each of the pair of thermally regenerating batteries to the controller and to a power rectification circuit. An external load is connected to the power rectification circuit such that a continuous power source is provided to the external load.

In another aspect, there is provided an electrical energy production system that includes at least a pair of thermally regenerating ammonia batteries with one of the batteries in a charging mode and the other in a discharging mode. A controller is operatively connected to the pair of thermally regenerating ammonia batteries. At least one heat source is coupled to a cooling loop including a pump moving a heat transfer fluid to at least one of the thermally regenerating ammonia batteries. A control valve is connected to the controller and to the pair of thermally regenerating batteries. The control valve distributes a heat transfer fluid to a specified one of the pair of thermally regenerating ammonia batteries. An electrical path is connected to each of the thermally regenerating ammonia batteries to the controller and to a power rectification circuit. An external load is connected to the power rectification circuit such that a continuous power source is provided to the external load.

In a further aspect, there is disclosed an electrical energy production system that includes at least a pair of thermally regenerating ammonia batteries with one of the batteries in a charging mode and the other in a discharging mode. A controller is operatively connected to the at least a pair of thermally regenerating ammonia batteries. Multiple heat sources are coupled to a cooling loop including a pump moving a heat transfer fluid to the at least a pair of thermally regenerating ammonia batteries. A control valve is connected to the controller and to the at least a pair of thermally regenerating batteries. The control valve distributes the heat transfer fluid to a specified one of the at least a pair of thermally regenerating ammonia batteries. An electrical path connects each of the at least a pair of thermally regenerating batteries to the controller and to a power rectification circuit. An external load is connected to the power rectification circuit such that a continuous power source is provided to the external load.

DETAILED DESCRIPTION OF THE PREFERRED EMBODIMENTS

Figure 1:
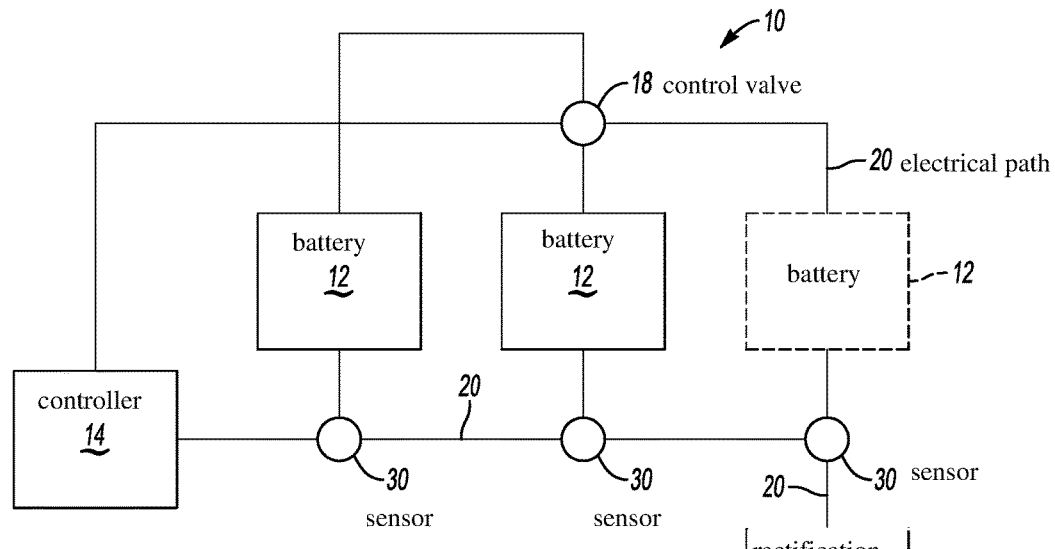
FIG. 1 is a schematic representation of an electrical energy production system.
Figure 2:
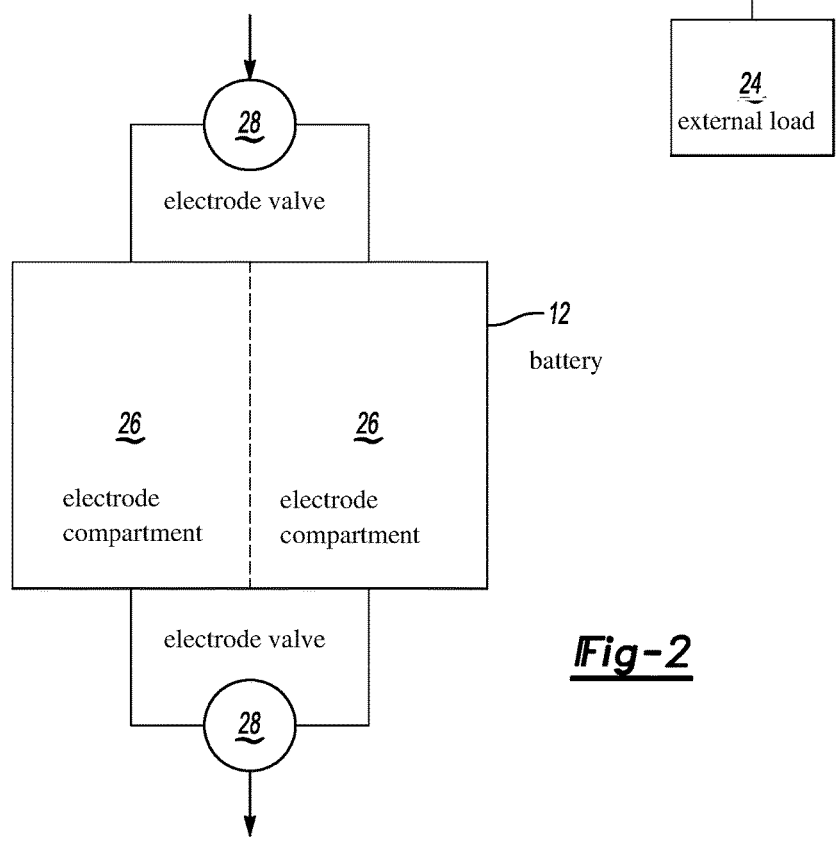
FIG. 2 is a schematic representation of a thermally regenerating ammonia battery associated with the system of FIG. 1.

Referring to the various figures, there is shown an electrical energy production system 10 that includes at least a pair of thermally regenerating ammonia batteries 12. Various numbers of pairs of thermally regenerating ammonia batteries 12 may be utilized to provide various power requirements. At least one of the batteries 12 is in a charging mode and the other is in a discharging mode. A controller 14 as best shown in FIG. 1 is operatively connected to the at least a pair of thermally regenerating ammonia batteries 12. At least one heat source 16 is connected to the at least a pair of thermally regenerating ammonia batteries 12. A control valve 18 is connected to the controller 14 and to the at least a pair of thermally regenerating batteries 12. The control valve 18 distributes heat from the heat source 16 to a specified one of the at least a pair of thermally regenerating ammonia batteries 12. An electrical path 20 connects each of the at least a pair of thermally regenerating batteries 12 to the controller 14 and to a power rectification circuit 22. An external load 24 is connected to the power rectification circuit 22 such that a continuous power source is provided to the external load 24.

Figure 4:
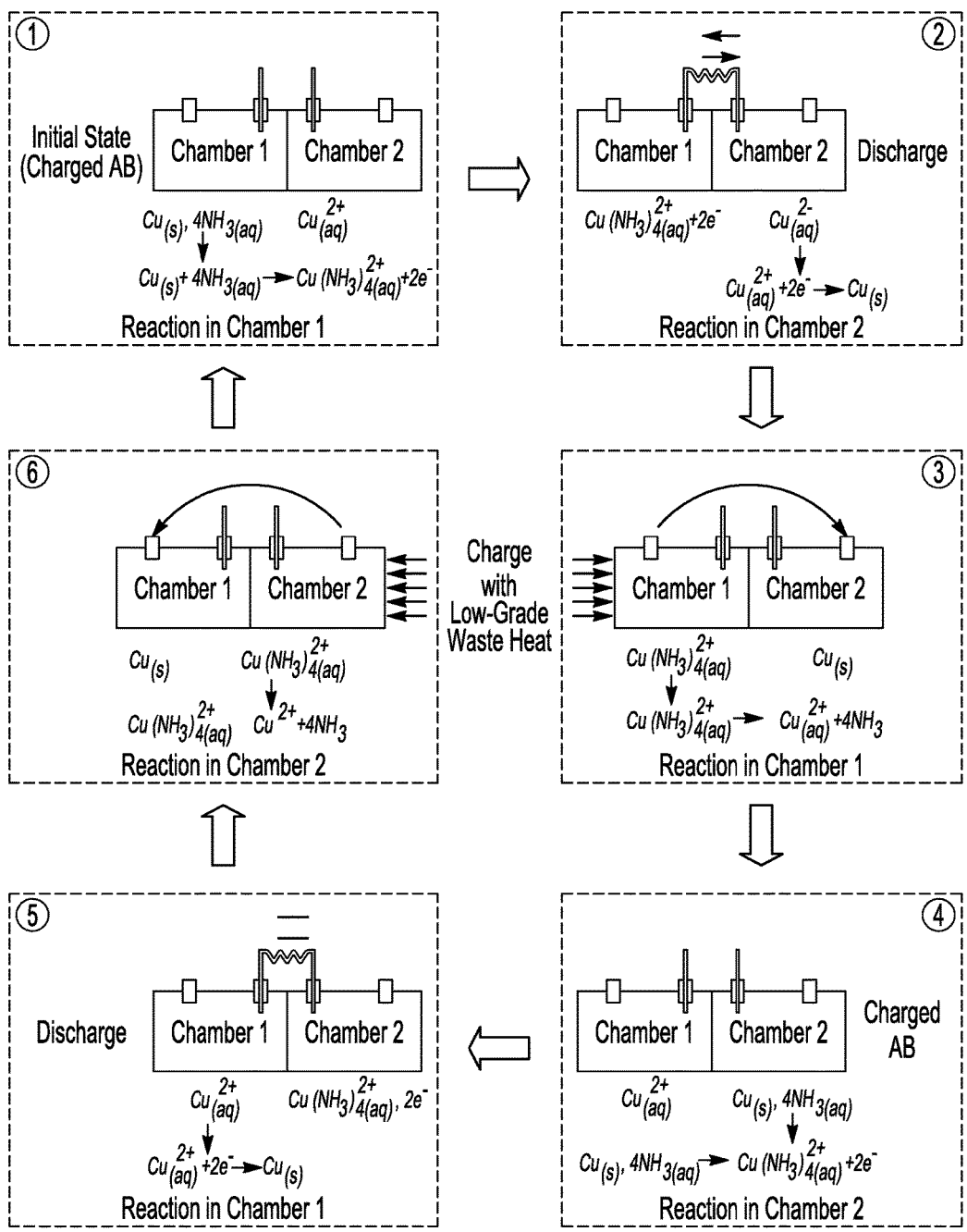
FIG. 4 is a schematic representation of a working cycle of a thermally regenerating ammonia battery.

Referring to FIGS. 2, 4, 6, and 8, each of the ammonia batteries 12 includes separated electrode compartments 26 and an electrode valve 28 connected to each of the separate electrode compartments 26. The electrode valve 28 is connected to the controller 14 regulating heat from the heat source 16 and directing heat to one of the electrode compartments 26 when the ammonia battery 12 is in the charging mode. Referring to FIG. 4, there is shown a schematic showing the working cycle of the thermally regenerating ammonia batteries 12. As shown in the figure, in the initial state there is provided a charged ammonia battery 12. In the initial state in chamber 1 there is an electrode made of copper that is immersed in an aqueous ammonia solution. The copper reacts with ammonia according to reaction 1 forming a copper ammonia complex and electrons.

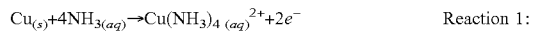

Reaction 1:

In chamber 2 there is provided an electrode made of copper immersed in a copper ion aqueous solution.

In step 2 an external load is applied to the circuit to discharge the ammonia battery. The electrons will flow from chamber 1 to chamber 2 such that in chamber 2 the copper ions capture the electrons and deposit copper to the electrode according to reaction 2.

Reaction 2:

In step 3 a waste heat source is applied to chamber 1 to distill ammonia from the copper ammonia complex. The concentrated ammonia then flows into chamber 2.

In step 4 chamber 1 is maintained with the copper ion aqueous solution and chamber 2 has deposited copper and aqueous ammonia which will react according to the same reaction as equation 1 provided above. Again, the ammonia battery is provided in a charged state which is similar to that of step 1. However, it is noted that the locations of the anode and cathode are switched or alternated with each other. Following the discharge process shown in step 5 and the charging process shown in step 6, the ammonia battery returns to its initial state as provided in step 1.

Figure 5:
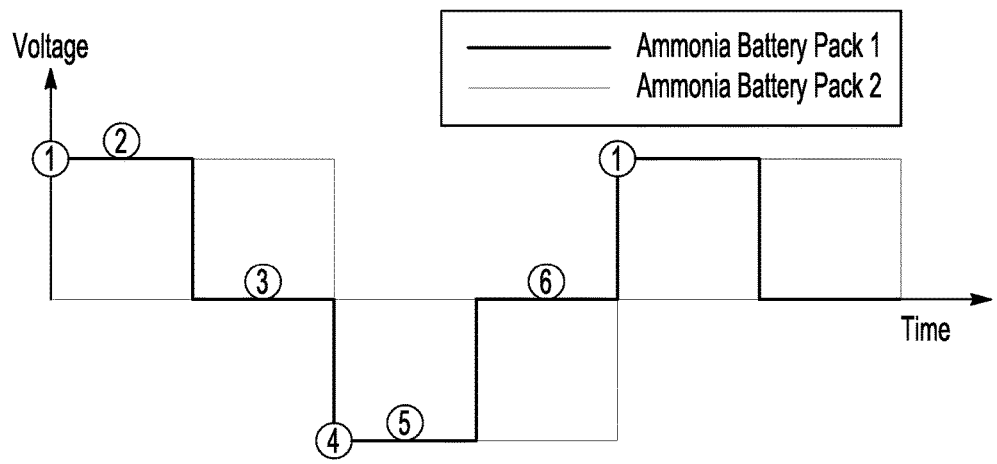
FIG. 5 is a graphic representation of the voltage of an electrical energy production system including ammonia battery packs as a function of time.

Referring to FIG. 5, there is shown a voltage output of the process described above with respect to FIG. 4 of the ammonia battery packs as a function of time. As can be seen in the figure, the six steps are marked in the figure. As can be seen in the figure, during the charging states of 3 and 6 there is no electrical or voltage output. Additionally, the two separated compartments 26 of the ammonia battery 12 work as an anode and cathode alternatively such that the direction of the current alternates itself at different discharging states such as the discharge states of steps 2 and 5. Therefore, to provide a continuous electrical output at least two ammonia batteries 12 or a pair are provided so that one of the ammonia battery packs 12 is in a discharging state while the other is in a charging state.

Again referring to FIG. 1, the electrical energy production system 10 includes a sensor 30 connected to each of the at least a pair of thermally regenerating ammonia batteries 12. The sensor is coupled to the controller 14 monitoring the charging and discharging mode of each of the at least a pair of thermally regenerating ammonia batteries 12. In one aspect, various sensors 30 may be utilized and may include a voltage sensor, current sensor, temperature sensor, concentration sensor, and a chemical reaction sensor to specify the charging state of the ammonia batteries 12.

Figure 7:
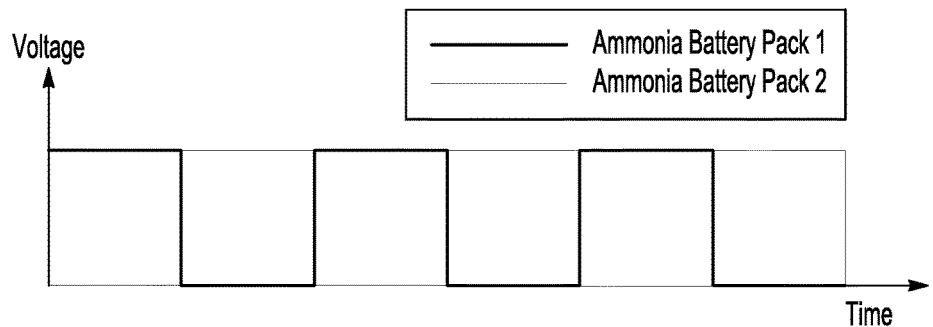
FIG. 7 is a plot of the voltage of ammonia battery packs as a function of time with current rectification.

As described above, the electrical energy production system 10 includes a power rectification circuit 22 such that a continuous electrical output or power source is provided to the load 24. Various power rectification structures including vacuum tube diodes, mercury-arc valves, copper and selenium oxide rectifiers, semiconductor diodes, silicon-controlled rectifiers and other silicon-based semiconductor switches, and other such electrical components may be coupled to the electrical energy production system 10 to produce a continuous power source. Referring to FIG. 7, there is shown a rectified current as a function of time including the six steps as described above with reference to FIG. 4. As can be seen in the figure, the first or second ammonia battery packs 12 of the pair provide a current at alternating time sequences such that a continuous power source is provided to an external load.

Figure 3A:
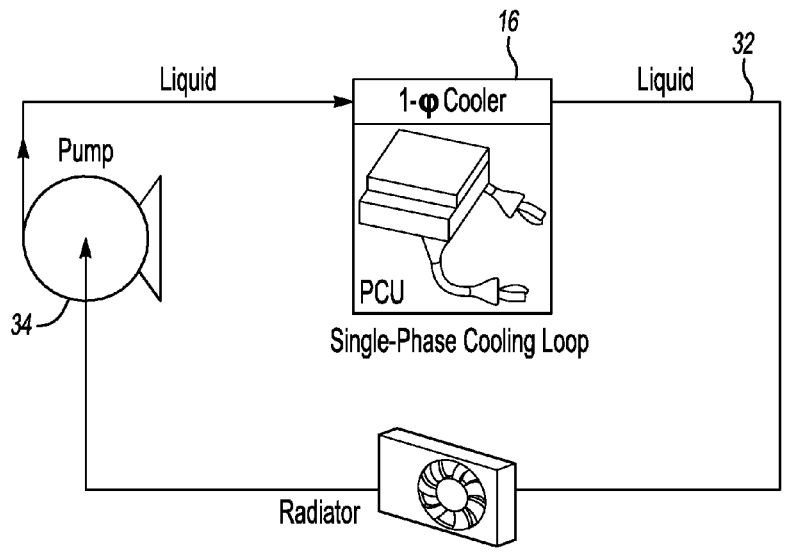
FIG. 3A is a schematic representation of a single phase cooling loop.
Figure 3B:
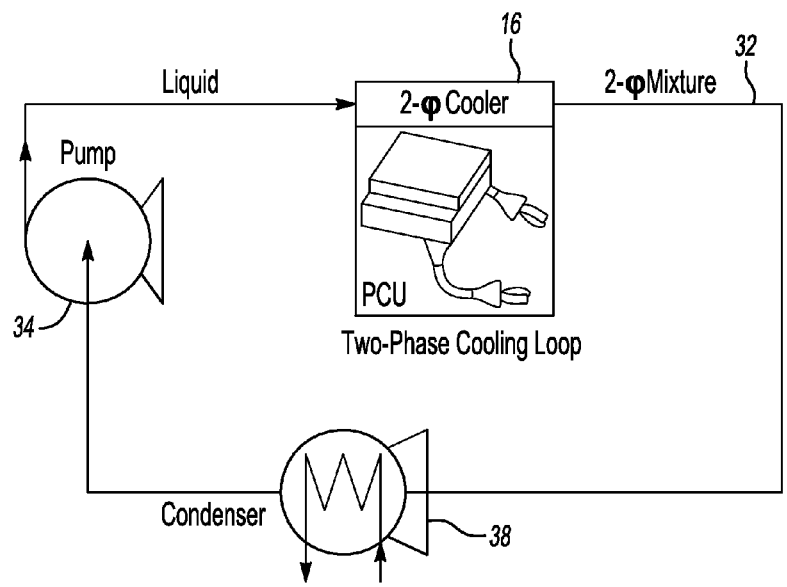
FIG. 3B is a schematic representation of a two phase cooling loop.

Various heat sources 16 may be coupled to the thermally regenerating ammonia batteries 12. In one aspect, the heat sources 16 may include heat generated from a powered circuit or PCU, heat from a coolant stream including coolant streams from an internal combustion engine, a heat stream from a powered control unit for a hybrid vehicle, a coolant stream from an electric motor, heat from an electronic device, solar heat from a solar collecting structure, and heat generated from a fuel cell. In one aspect, the heat source 16 is coupled to a cooling loop 32 that includes a pump 34 moving a heat transfer fluid 36, as shown in FIGS. 3A and 3B. In one aspect, the continuous power source may power the pump 34 within the various cooling loops 32. In one aspect, the heat transfer fluid 36 transfers heat from the heat source 16 to the ammonia battery 12 in the charging mode. As shown in FIGS. 3A and 3B, single phase and two phase cooling loops may be utilized. In one aspect, the two phase cooling loop includes a condenser 38 and pump 34 that moves the heat transfer fluid 36.

Figure 6:
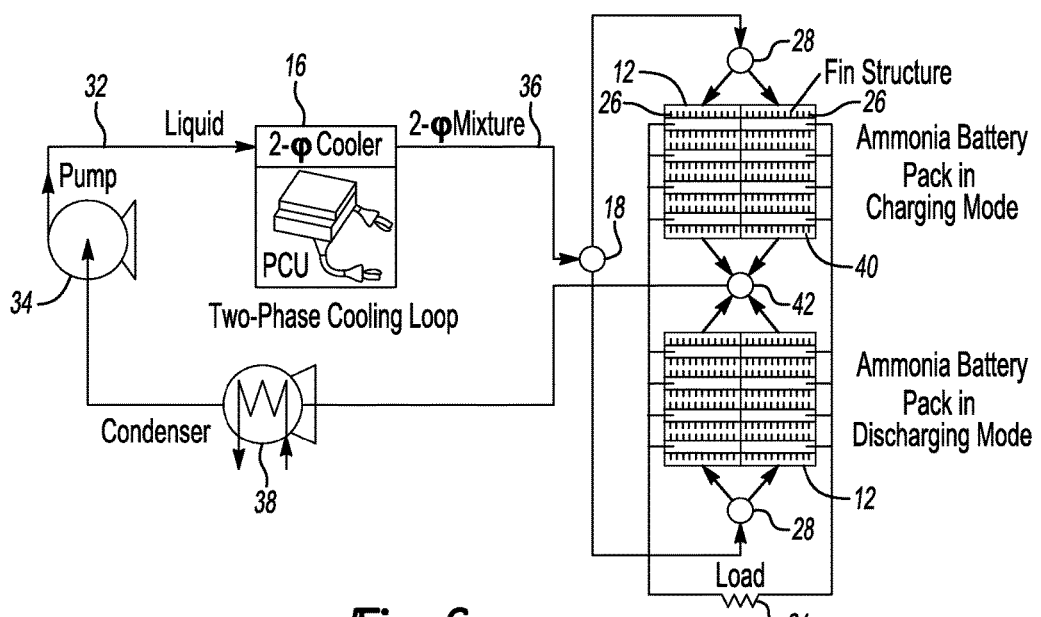
FIG. 6 is a schematic representation of one embodiment of an electrical energy production system including a two phase cooling loop harvesting waste energy from a heat source and coupled to a pair of thermally regenerating ammonia batteries.

The cooling loop 32 may include various numbers of heat sources 16. In one aspect as shown in FIG. 6, the cooling loop 32 may include a two phase cooling loop having a condenser 38 and pump 34 coupled to a heat source 16 such as an electronic control unit. It should be realized that various numbers and types of heat sources may be coupled to the cooling loop 32. A two phase mixture is provided as the heat transfer fluid 36 in the two phase cooling loop such that the two phase mixture is routed to a control valve 18. The control valve 18 distributes the heat transfer fluid 36 to one of the ammonia battery devices 12 in a charging mode. As shown in the figure, the battery packs 12 may include a fin structure 40 to increase a heat transfer area. A second electrode valve 28 distributes the heat transfer fluid 36 to an appropriate separated electrode compartment 26 of the battery. The heat transfer fluid exits either of the compartments 26 to a valve 42 that routes it back to the two phase cooling loop 32.

Figure 8:
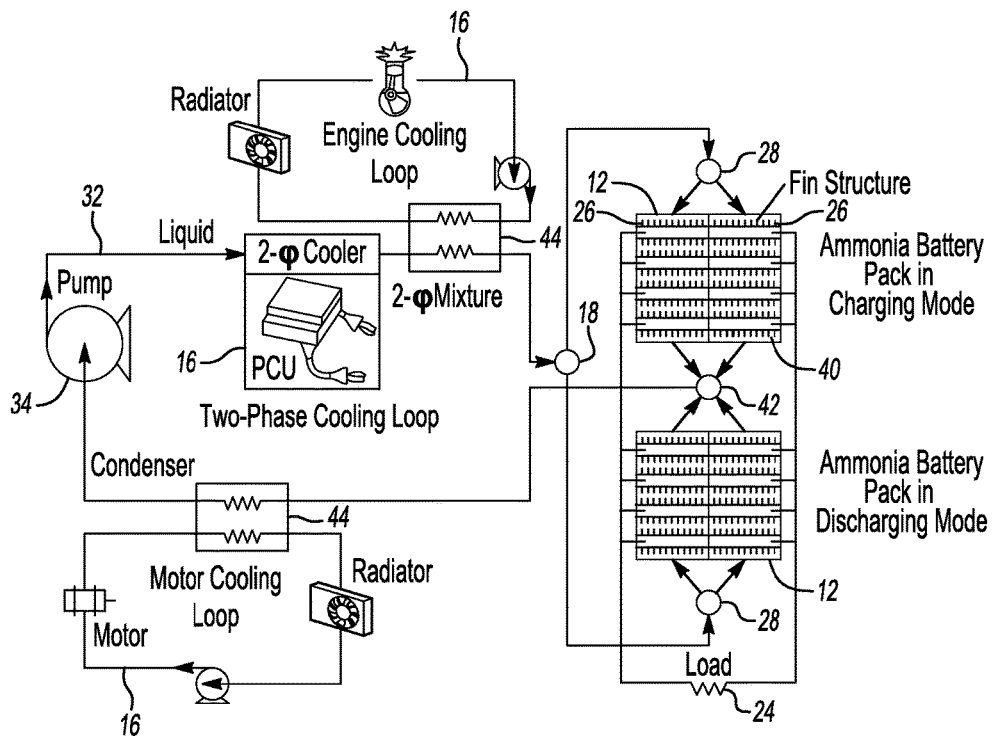
FIG. 8 is a schematic representation of an electrical energy production system harvesting low grade waste heat from an engine cooling loop, PCU cooling loop, and additional heat source using a two phase cooling loop coupled to a pair of thermally regenerating ammonia battery packs.

In another aspect, the electrical energy production system 10 may include a cooling loop 32 that includes multiple heat sources 16 coupled to the cooling loop 32. As shown in FIG. 8, multiple heat sources 16 including an internal combustion engine cooling loop, and a PCU cooling loop, and an electric motor loop may be coupled to the cooling loop 32. The basic structure of the cooling loop 32 is similar to that described above with respect to FIG. 6 with the addition of additional heat exchangers 44 to provide transfer of heat from the various heat sources 16 to and from the two phase cooling loop 32, as will be described in more detail below.

In one aspect, the exit temperature of the two-phase cooling loop may be around 80° C., while the engine coolant leaving the engine is at a higher temperature such as 105° C. The engine loop is coupled with the two-phase cooling loop 32 with a heat exchanger 44; transferring heat to the two-phase mixture before the coolant is routed to the ammonia battery packs 12. The two-phase cooling loop 32 which includes the PCU cooling loop and engine cooling loop that provide two heat sources that are combined together for the waste heat harvesting by the ammonia battery packs 12.

Additionally, the engine coolant temperature may be reduced before it is routed into the radiator, so that the cooling load of the radiator is reduced requiring a smaller or reduced size structure. In one aspect, the motor cooling loop may include a temperature of about 65° C., such that the heat exchanger 44 which couples it to the two-phase cooling loop 32 may operate as a condenser for the two-phase coolant.

Referring to FIG. 6, a condenser 38 is disposed in the two-phase cooling loop 32 to condense the refrigerant or heat transfer fluid from two-phase mixture into liquid phase. Alternatively in FIG. 8, the motor cooling loop has a relatively lower working temperature than the two-phase cooling loop 32, such that the motor cooling loop may operate as the condenser for the two-phase cooling loop 32 where heat is transferred from the two-phase cooling loop 32 to the motor cooling loop through the heat exchanger 44.

Various external loads 24 may be coupled to the electrical energy production system 10. Various external loads may include storage batteries, capacitors, or power consuming mechanisms. In this manner, electrical energy may be stored in the storage batteries for use at a desired time period or stored in a capacitor for release upon a command. In one aspect, the electrical energy production system 10 may be utilized to power the various pumps and power consuming mechanisms associated with the electrical energy production system such that a self-powered system is provided that disperses heat produced by various components of a vehicle.

Various mechanisms and structures may be provided to allow for heat transfer to the ammonia batteries 12 from the heat sources 16. In one aspect, heat may be transferred to the ammonia battery 12 by conduction from an exterior of the battery. In this manner, the batteries are provided with an external housing of a heat conductive material such as metal or other known heat conductors to allow transfer of heat from the heat source which may or may not include a heat transfer fluid. Additionally, the ammonia batteries may include external fin structures 40, as described above, that are coupled thereon transferring heat from the heat source 16 to the ammonia battery 12. Additionally, heat may be transferred to the ammonia battery 12 by conduction from a heat transfer fluid positioned within heat transfer tubes disposed within the interior of the ammonia battery 12. In such a structure a tube and shell configuration may provide efficient heat transfer to the ammonia batteries 12.

We claim:

1. An electrical energy production system comprising:
at least a pair of thermally regenerating ammonia batteries, one of the batteries in a charging mode and the other in a discharging mode wherein each of the thermally regenerating ammonia batteries includes separated electrode compartments where each of the compartments work as an anode and cathode alternatively wherein the direction of the current alternates;
a controller operatively connected to the at least a pair of thermally regenerating ammonia batteries;
at least one heat source connected to the at least a pair of thermally regenerating ammonia batteries;
a control valve connected to the controller and to the at least a pair of thermally regenerating ammonia batteries, the control valve distributing heat from the heat source to a specified one of the at least a pair of thermally regenerating ammonia batteries;
an electrical path connecting each of the at least a pair of thermally regenerating ammonia batteries to the controller and to a power rectification circuit; and
an external load connected to the power rectification circuit wherein a continuous power source is provided to the external load.

2. The electrical energy production system of claim 1 wherein each of the ammonia batteries includes separated electrode compartments and an electrode valve connected to each of the separate electrode compartments, the electrode valve connected to the controller regulating heat from the heat source and directing heat to one of the electrode compartments when the ammonia battery is in the charging mode.

3. The electrical energy production system of claim 1 including a sensor connected to each of the at least a pair of thermally regenerating ammonia batteries, the sensor coupled to the controller monitoring the charging and discharging mode of each of the at least a pair of thermally regenerating ammonia batteries.

4. The electrical energy production system of claim 3 wherein the sensors are selected from the group consisting of: a voltage sensor, current sensor, temperature sensor, concentration sensor, and a chemical reaction sensor.

5. The electrical energy production system of claim 1 wherein the power rectification circuit are selected from the group consisting of: vacuum tube diodes, mercury-arc valves, copper and selenium oxide rectifiers, semiconductor diodes, silicon-controlled rectifiers and silicon-based semiconductor switches.

6. The electrical energy production system of claim 1 wherein the heat source includes: heat generated from a powered circuit, heat from a coolant stream including coolant streams from an internal combustion engine, heat stream from a power control unit for a hybrid vehicle, coolant stream from an electric motor, heat from an electronic device, solar heat from a solar collecting structure, heat generated from a fuel cell.

7. The electrical energy production system of claim 1 wherein the heat source is coupled to a cooling loop including a pump moving a heat transfer fluid.

8. The electrical energy production system of claim 7 wherein the continuous power source powers the pump.

9. The electrical energy production system of claim 7 wherein the heat transfer fluid transfers heat from the heat source to the ammonia battery in the charging mode.

10. The electrical energy production system of claim 1 wherein the heat source is coupled to a two phase cooling loop including a condenser and pump moving a heat transfer fluid.

11. The electrical energy production system of claim 10 wherein the heat transfer fluid transfers heat from the heat source to the ammonia battery in the charging mode.

12. The electrical energy production system of claim 11 wherein the continuous power source powers the pump.

13. The electrical energy production system of claim 7 wherein the cooling loop includes multiple heat sources coupled to the cooling loop.

14. The electrical energy production system of claim 13 wherein the multiple heat sources include an internal combustion engine cooling loop, a PCU cooling loop and an electric motor loop.

15. The electrical energy production system of claim 14 wherein the electric motor cooling loop includes a relatively lower working temperature than the cooling loop, such that the electric motor loop operates as a condenser for the cooling loop where heat is transferred from the cooling loop to the motor cooling loop through a heat exchanger.

16. The electrical energy production system of claim 1 wherein the external load includes storage batteries, capacitors or power consuming mechanisms.

17. The electrical energy production system of claim 1 wherein heat is transferred to the ammonia battery by conduction from an exterior of the battery.

18. The electrical energy production system of claim 1 wherein the ammonia batteries include external fin structures coupled thereon transferring heat from the heat source to the ammonia battery.

19. The electrical energy production system of claim 1 wherein heat is transferred to the ammonia battery by conduction from heat transfer tubes positioned within an interior of the ammonia battery.

20. An electrical energy production system comprising:
at least a pair of thermally regenerating ammonia batteries, one of the batteries in a charging mode and the other in a discharging mode wherein each of the thermally regenerating ammonia batteries includes separated electrode compartments where each of the compartments work as an anode and cathode alternatively wherein the direction of the current alternates;
a controller operatively connected to the at least a pair of thermally regenerating ammonia batteries;
at least one heat source coupled to a cooling loop including a pump moving a heat transfer fluid to the at least a pair of thermally regenerating ammonia batteries;
a control valve connected to the controller and to the at least a pair of thermally regenerating ammonia batteries, the control valve distributing the heat transfer fluid to a specified one of the at least a pair of thermally regenerating ammonia batteries;
an electrical path connecting each of the at least a pair of thermally regenerating ammonia batteries to the controller and to a power rectification circuit; and
an external load connected to the power rectification circuit wherein a continuous power source is provided to the external load.

21. An electrical energy production system comprising:
at least a pair of thermally regenerating ammonia batteries, one of the batteries in a charging mode and the other in a discharging mode wherein each of the thermally regenerating ammonia batteries includes separated electrode compartments where each of the compartments work as an anode and cathode alternatively wherein the direction of the current alternates;
a controller operatively connected to the at least a pair of thermally regenerating ammonia batteries;
multiple heat sources coupled to a cooling loop including a pump moving a heat transfer fluid to the at least a pair of thermally regenerating ammonia batteries;
a control valve connected to the controller and to the at least a pair of thermally regenerating ammonia batteries, the control valve distributing the heat transfer fluid to a specified one of the at least a pair of thermally regenerating ammonia batteries;
an electrical path connecting each of the at least a pair of thermally regenerating ammonia batteries to the controller and to a power rectification circuit; and
an external load connected to the power rectification circuit wherein a continuous power source is provided to the external load.

\* \* \* \* \*